United States Patent [19]
Farr et al.

[11] Patent Number: 5,445,447
[45] Date of Patent: Aug. 29, 1995

[54] HYDRAULIC ANTI-LOCKING SYSTEMS FOR VEHICLES

[75] Inventors: Glyn P. R. Farr, Leek Wootton; Philip W. Sheriff, Studley, both of England

[73] Assignee: Lucas Industries public limited company, England

[21] Appl. No.: 311,901

[22] Filed: Sep. 26, 1994

Related U.S. Application Data

[63] Continuation of Ser. No. 969,152, Feb. 10, 1993, abandoned.

[30] Foreign Application Priority Data

Sep. 28, 1990 [GB] United Kingdom ............... 9021231
Mar. 13, 1991 [GB] United Kingdom ............... 9105324

[51] Int. Cl.6 .................... B60T 8/42; B60T 8/50
[52] U.S. Cl. .................... 303/117.1; 303/116.1; 303/119.1; 303/900
[58] Field of Search ............ 303/117.1, 116.1, 116.2, 303/116.3, 116.4, 61-63, 68-69, 72, 119.1, 119.2, 113.1, 113.2, 115.1, 115.4, 115.5, 115.6, 84.1, 84.2, 900, 901, DIG. 1, DIG. 2, DIG. 3, DIG. 4; 251/129.15; 137/596.17, 625.65

[56] References Cited

U.S. PATENT DOCUMENTS

| | | |
|---|---|---|
| 3,856,047 | 12/1974 | Takayama . |
| 4,350,396 | 9/1982 | Mortimer ............... 303/115.4 |
| 4,715,666 | 12/1987 | Farr ............... 303/116.4 |
| 4,775,193 | 10/1988 | Farr et al. ............... 303/72 X |
| 4,915,459 | 4/1990 | Hashida et al. ............... 303/117.1 X |
| 5,002,344 | 3/1991 | Hashida ............... 303/117.1 |
| 5,026,123 | 6/1991 | Nokubo et al. ............... 303/115.4 X |
| 5,094,512 | 3/1992 | Kohno et al. ............... 303/117.1 |

FOREIGN PATENT DOCUMENTS

| | | |
|---|---|---|
| 0202845 | 11/1986 | European Pat. Off. . |
| 0344544 | 12/1989 | European Pat. Off. . |
| 0361336 | 4/1990 | European Pat. Off. . |
| 0401856 | 12/1990 | European Pat. Off. . |
| 2643860 | 3/1978 | Germany . |
| 8001783 | 9/1980 | WIPO . |

*Primary Examiner*—Douglas C. Butler
*Attorney, Agent, or Firm*—Laff, Whitesel, Conte & Saret, Ltd.

[57] ABSTRACT

In an hydraulic anti-lock braking system a flow control valve operates with a single-acting solenoid-operated valve (35), and the flow control valve incorporates a spool (17) working in a bore (8) in a housing (7) with the flow directed thorough a passage (20) passing substantially through the centre of the spool (17). A fixed orifice (21) is located at the one end of the spool which defines a chamber (19) for a control spring (18), and a variable orifice is defined between a port (33) in the housing (7) and a metering edge on the input side of an annular groove (24) in the spool (17) and which communicates with the passage (20) in the spool (17).

11 Claims, 4 Drawing Sheets

HYDRAULIC ANTI-LOCKING SYSTEMS FOR VEHICLES

This application is a continuation of application Ser. No. 07/969,152, filed Feb. 10, 1993, now abandoned.

This invention relates to hydraulic anti-lock braking systems for vehicles of the kind in which the pressure applied to a braked wheel is controlled in response to signals from an electronic control unit, in turn responsive to signals from a speed sensor associated with the wheel.

A system of the kind set forth is disclosed in EP-A-0 202 845. In the system of EP-A-0 202 845 a flow control valve operates with a single-acting normally closed solenoid-operated valve to provide effective control of the pressure in the braked wheel in response to signals from the electronic control unit.

The flow valve of EP-A-0 202 845 embodies a number of novel features namely:

a) In a first quiescent position, it permits a free flow of fluid between an inlet connected to the input from an hydraulic master cylinder and an outlet connected to the output to the brake;
b) In a first transient position the master cylinder is isolated from the brake;
c) In a second transient position the brake is connected to an expansion chamber by way of the solenoid-operated valve which is open; and
d) In a second quiescent position, the flow valve meters fluid from the inlet to the outlet at a rate determined by a constant pressure drop across an orifice in a spool, which pressure drop is dependent upon the force of a control spring and the area of the spool.

The constant pressure drop also ensures a constant flow rate irrespective of any excess level of input pressure and because the rate at which the volume of the brake increases as the pressure rises, the flow valve provides a variable re-apply rate with brake pressure level. At low brake pressures, the re-application rate is relatively slow which compensates for the reduced wheel acceleration rate on slippery surfaces. At higher brake pressures, for high friction road conditions, the ability for the wheel to accelerate is increased and the re-application of brake pressure following a skid correction can also be increased.

EP-A-0 344 544 discloses a flow valve having similar features to those of EP-A-0 202 845. In EP-A-0 344 544 however the flow is directed through the centre of the spool. This has the advantage of a longer leakage path between the input and the output whilst the spool is in its control mode, but with the inherent disadvantage of increasing from two to three the number of parasitic leakage paths between a chamber accommodating the control spring and the input/output connections at least when the solenoid-operated valve is actuated. In EP-A-0 344 544 a fixed orifice is located at an intermediate point in the length of the centre of the spool.

According to a first aspect of the invention, in an hydraulic anti-lock braking system for a vehicle in which the pressure applied to a braked wheel is controlled in response to signals from an electrical control unit, in turn responsive to signals from a speed sensor associated with the wheel, and in which a flow valve operates with a single solenoid-operated valve, the flow valve incorporates a spool provided with a number of external annular grooves working in a bore in a housing with the flow to the brake directed through a passage passing substantially through the centre of the spool, a fixed orifice located at or adjacent one end of the spool of which a portion of the bore at that end of the spool defines a chamber for a control spring, and a variable orifice is defined between a port in the housing and a metering edge on the input side of an annular groove in the spool and which communicates with the passage in the spool, is characterised in that fluid is dumped from the brake via an annular groove in the spool which does not communicate with the passage in the spool via a passage in the spool extending from the groove to the passage.

The annular groove in the spool nearest the fixed orifice may suitably be the annular groove that does not communicate with the passage in the spool via a passage in the spool extending from the groove to the passage.

In the skid control or ABS mode the tolerances affecting the clearances between the spool and the bore are relatively non-critical since the flow valve has only one parasitic leak path whilst the spool is in transient mode and with only one extra leakage path whilst the spool is in metering mode.

Our invention retains all the benefits of the flow valves of EP-A-0 202 845 and EP-A-0 344 544 but has a reduced parasitic leakage between the spring chamber and the input/output. This enables larger tolerances to be used between the spool and the bore.

Locating the fixed orifice at or adjacent one end of the spool with the absence of flow passages beyond the orifice facilitates tolerance free machining, suitably gauge machined using the end face as a datum.

Our invention therefore not only utilises the reduced leakage between input and output, but also reduces the parasitic leakage between the spring chamber and the input/output to one when the solenoid-operated valve is opened.

The flow valve may be provided with an attenuation chamber and orifice to reduce the driver's pedal reaction. This attenuates the difference between the pump output and the flow being metered to the brake.

Some embodiments in accordance with our invention are illustrated in the accompanying drawings in which.

Figure 1:
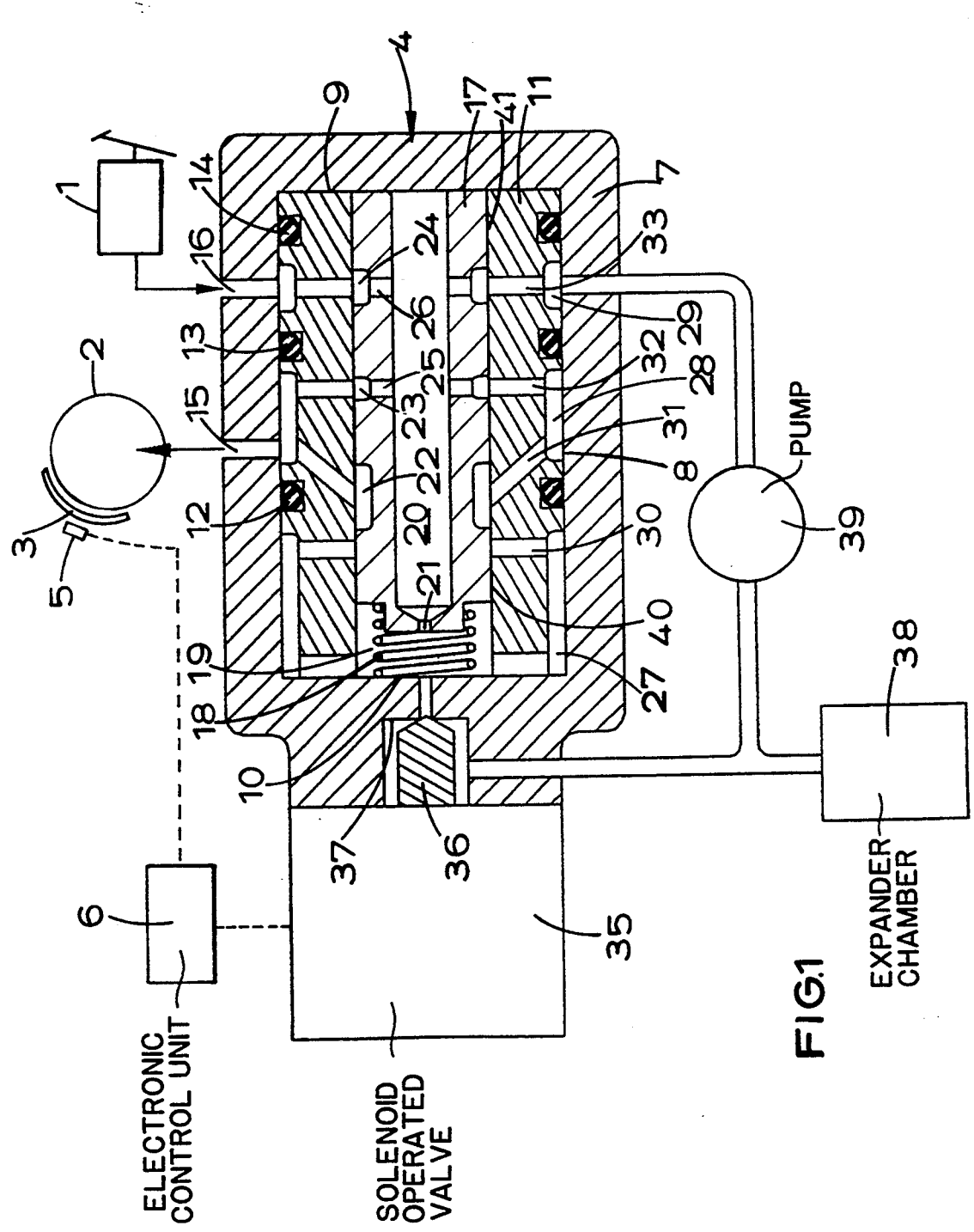
FIG. 1 is a layout of an hydraulic anti-lock braking system for a vehicle.

The braking system illustrated in FIG. 1 of the accompanying drawings comprises a pedal-operated hydraulic master cylinder 1 for applying a brake 2 on a wheel 3 of a vehicle through a modulator assembly 4. The behaviour of the wheel is sensed by a wheel speed sensor 5 which sends signals to an electronic control unit 6, and the signals are differentiated by the unit which, in turn, emits an energising current to control operation of the modulator assembly 4.

The modulator assembly 4 comprises a housing 7 having a longitudinal bore 8 extending between axially spaced faces 9, 10 at opposite ends of the housing 7. A sleeve 11 received in the bore 8 is provided with three annular seals 12, 13, 14 of which the seals 12 and 13 are disposed on opposite sides of an outlet passage 15 leading to the brake 2, and the seals 13 and 14 are disposed on opposite sides of an inlet passage 16 from the master cylinder 1.

A spool 17 works in the bore of the sleeve 11 and is biased against the face 9 by a spring 18 housed in a chamber 19 between the opposite end of the spool 17 and the face 10. The spool 17 has a central passage in the form of a drilling 20 with a fixed restrictor 21 at or adjacent to the end adjacent to the spring chamber 19. The spool 17 is also provided with three, external, annular grooves 22, 23, 24 of which the two grooves 23, 24 furthest from the spring chamber 19 have radial passages 25, 26 communicating with the drilling 20.

The sleeve 11 has three grooves 27, 28, 29 and four cross passages 30, 31, 32, 33 adapted to connect with the grooves 22, 23, 24 in either a quiescent or transient state.

A single acting solenoid operated dump valve 35 has a valve member 36 which normally engages with a seating 37 in the housing 7 to isolate the spring chamber 19 from an expander chamber 38, and a pump 39 is adapted to withdraw fluid from the expander chamber 38 and return it to the cross passage 33.

In a normal inoperative position for normal brake operation fluid from the master cylinder 1 passes freely through the cross passages 33, the radial passages 26, the central drilling 20, the radial passages 32 and the outlet passage 15 to the brake 2.

Upon receipt of a skid signal from the electronic control unit 6, the solenoid-operated valve 35 opens to connect the spring chamber 19 to the expander chamber 38. At this point fluid flows from the inlet 16 to the spring chamber 19 through the restrictor 21 and leaks through a single leak path defined by a land 40 between the end of the spool 17 and the groove 22.

When the pressure differential across the area of the spool 17 subjects the spool 17 to a force sufficient to overcome the force of the spring 18, the spool 17 moves to:

a) Isolate the inlet 16 from the outlet 15;
b) Connect the outlet 15 to the spring chamber 19; and
c) Attain its metering position defined by a variable orifice constituted by the co-operation of the groove 24 with the passages 33 with the edge on the input side.

The reduction in pressure permits a recovery of the wheel 3, the skid signal is cancelled, and the solenoid-operated valve 35 is closed. The spool 17, however, remains in its metering position with the outlet 15 and the spring chamber 19 interconnected whilst the output pressure is less than the input pressure. In its metering mode the spool 17 has a leakage past the land 41 at the end of the spool 17 remote from the spool chamber 19. This leakage will be smaller than the metered flow and is directed to the brake 2 through the restricted orifice. Since the leakage is not between the inlet 16 and the outlet 15, there is no parasitic leakage.

When the solenoid-operated valve 35 is first opened, the initial pressure drop of fluid in the spring chamber 19 provides the differential necessary to cause the spool 17 to move against the spring 18. Ideally, no leakage between the inlet 16 and the spring chamber 19 should occur but, of necessity, flow occurs across the fixed orifice 21. Any other leakage is parasitic but such leakage occurs only at the land 40 immediately adjacent the spring chamber 19. The tolerances controlling clearances in the diameters of the spool 17 and the sleeve 11 can, therefore, be relaxed which means that the components are therefore easier to manufacture.

In the construction described above the pump 39 is adapted to return fluid to the inlet 16 at the same time as the spool 17 is metering fluid into the brake 2. The difference between these two flows, although small, is felt at the brake 2 as a slight pulsation.

Figure 2:
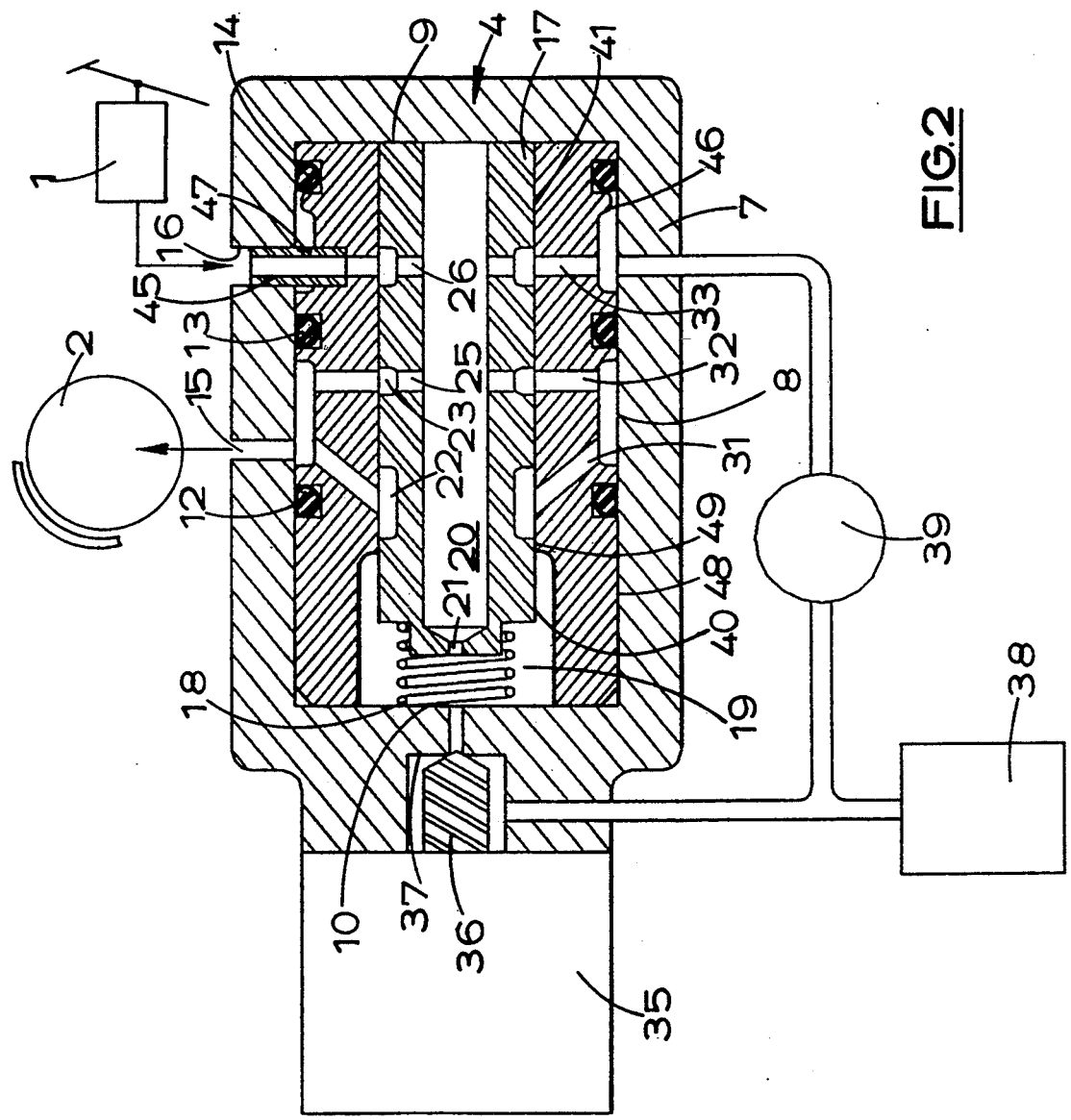
FIG. 2 is a layout similar to FIG. 1 but showing a modified construction.

In a modified construction as illustrated in FIG. 2 of the accompanying drawings, the input from the master cylinder 1 is fed via a steel tube 45 pressed into the housing 7 and the sleeve 11. An annular attenuation chamber 46 is defined between the housing 7 and the sleeve 11 and with which the return from the pump 39 communicates. An orifice 47 in the wall of the tube 45 leads into the annular chamber 46.

The passage 30 is omitted. The portion 48 of the sleeve 11 forward of the seal 12 is increased in diameter to fit the bore 8, and the internal bore of the sleeve 11 is enlarged to provide communication between the passage 31 and the chamber 19 when a land 49 forward of the passage 31 clears the land 40.

In the skid control or ABS mode the pump 39 returns fluid to the enlarged annular attenuation chamber 46 and fluid is metered to the brake 2 via the series of radial passages in the sleeve 11. Fluid is also metered through the single input defined by the steel tube 45 between the input and the brake 2. The excess flow between the output from the pump 39 and that metered to the brake 2 is attenuated by the fluid in the annular chamber 46 and the orifice 47 in the side-wall of the tube 45.

This improves pedal feel in comparison with the modulator of FIG. 1.

The construction and operation of the assembly of FIG. 2 is otherwise the same as FIG. 1, and corresponding reference numerals have been applied to corresponding parts.

In the modulator assemblies described above the solenoid valve 35 is spring-loaded against the pressure which can be generated at the input. The solenoid valve 35 is positioned adjacent to the spring chamber 19 to reduce to a minimum the volume of the spring chamber 19. This is necessary to avoid premature movements of the spool 17 due to air trapped in the spring chamber 19.

Figure 3:
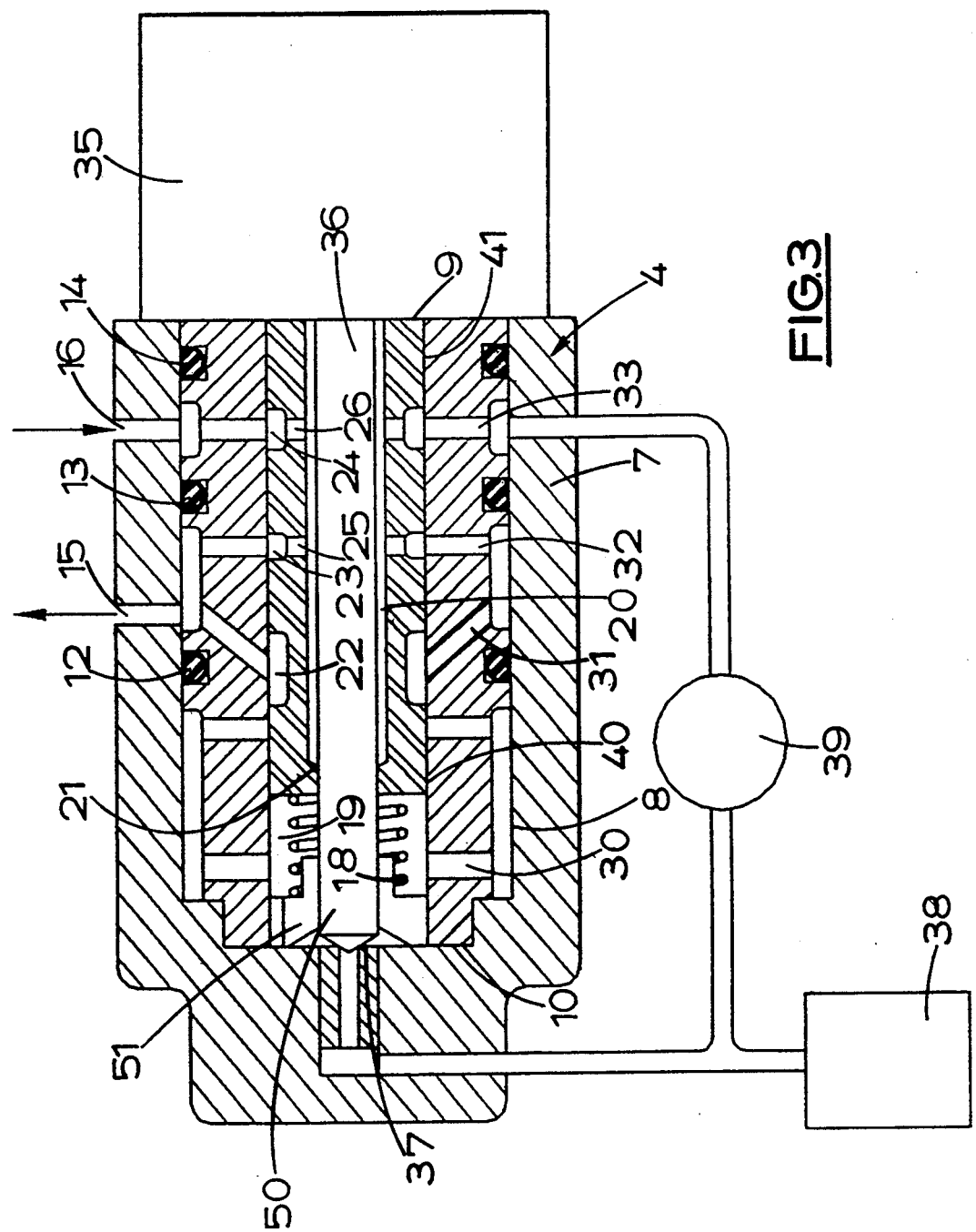
FIG. 3 is a layout of another anti-lock braking system for a vehicle.

In the modulator assembly 4 illustrated in FIG. 3 of the accompanying drawings the solenoid-operated valve 35 is mounted at the opposite end of the housing 7, and the valve member 36 is extended in length to project with clearance through the centre drilling 20 in the spool 17. A portion 50 terminating at the free end of the valve member 36 is guided in a guide 51 to maintain concentricity between the valve member 36 and the drilling 20.

The fixed orifice 21 is defined by an annular passage between the valve member 36 and an opening of reduced diameter at the inner end of the spool 17 adjacent to the chamber 19.

The solenoid valve 35 is pressure loaded onto the seating 37 and only a light spring is required. This, is advantageous since the valve is easy to open at the low pressures encountered on low friction surfaces, and more difficult to open at the high pressures appropriate to braking on high friction surfaces. Consequently the solenoid valve 35 is quicker to act on low friction road surfaces where rapid wheel excursions from true speed are more likely. The valve member is located in the interior of the spool and does not contribute extra volume to the spring chamber 19.

The construction and operation of the modulator assembly of FIG. 3 is otherwise the same as that of FIG.

1, and corresponding reference numerals have been applied to corresponding parts.

Figure 4:
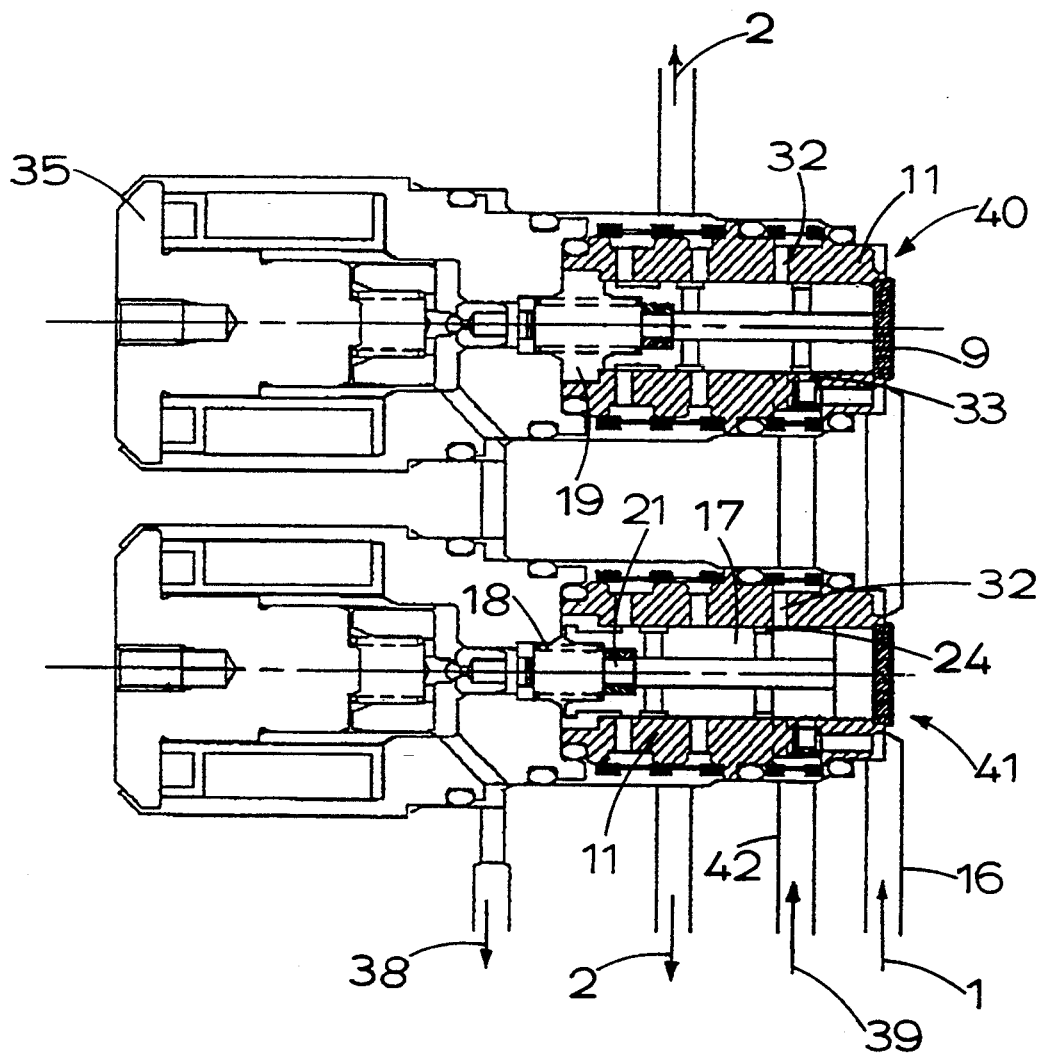
FIG. 4 is a layout of still another anti-lock braking system for a vehicle.

The braking system illustrated in FIG. 4 of the accompanying drawings comprises two modulator assemblies 40, 41. Reference numerals corresponding to those used in FIG. 1 have been applied to corresponding parts of the modulator assemblies 40 and 41. One modulator assembly controls the application of the right hand brake, the other controls the application of the left hand brake.

The spool 17 in the modulator assembly 40 is shown in the normal inoperative position, and the spool 17 in the modulator assembly 41 is shown in its metering position.

Passage 33 is displaced axially towards the wall 9 with respect to the passage 32, to isolate the expander chamber 38 from the master cylinder other than through the restrictors 21 in the spools 17 and the sleeves 11 of the modulator assemblies 40, 41.

When solenoid-operated valve 35 is first opened, the initial pressure drop of fluid in the spring chamber 19 provides the differential necessary to cause the spool 17 to move against the spring 18, and isolate the brake 2 from the master cylinder 1 by closing the inner end of passage 33.

Further movement of the spool in the same direction keeps the master cylinder isolated as the port at the inner end of the passage 33 is kept closed, and the spool reaches its metering edge of the groove 24 with the passage 32. At this point the brake pressure is held at a constant level and the pump 39 is adapted to return fluid to the inlet 16. As these two flows are substantially equal, the reaction at the brake pedal is minimal. Pump output can only pass to the master cylinder via the passages in both spool sleeves 11.

We claim:

1. A hydraulic anti-lock braking system for a vehicle, said braking system comprising means for controlling a pressure applied to a brake associated with a wheel in response to control signals from an electrical control unit, means responsive to signals from a speed sensor associated with said wheel for causing said control unit to provide said control signals, a flow valve coupled to operate a single solenoid-operated valve, said flow valve incorporating a spool working in a bore in a housing with a fluid flow to the brake directed through a longitudinal passage passing substantially through a central axis of said spool, first means defining a plurality of external annular grooves in the spool, a wall in said spool preventing fluid communication between a first one of said annular grooves and said longitudinal passage, radial passages providing communication between the remainder of said external annular grooves and said longitudinal passage, a fixed orifice located at an adjacent one end of said spool where a portion of said bore at said end of said spool defines a chamber for a control spring, a variable orifice between a port in said housing and a metering edge on an input side of one of said remainder of said external annular grooves in said spool, second means defining a by-pass dump path for fluid from said brake to said chamber, said second means comprising a connection between said brake and said first annular groove, and means for providing fluid communication between said first annular groove and said chamber at least when said spool is advanced in said bore in opposition to a bias of said control spring, wherein said fluid is dumped from said brake via said first annular groove in said spool.

2. A hydraulic anti-lock braking system for a vehicle according to claim 1, wherein said first annular groove in said spool is one of said plurality of said grooves located nearest said fixed orifice.

3. A hydraulic anti-lock system according to claim 2, and a steel tube pressed into said bore for supplying a fluid input signal from a master cylinder.

4. A hydraulic anti-lock system according to claim 1, wherein at least two of said remainder of said external annular grooves in said spool and located furthest from said control spring chamber have radial fluid passages communicating with said longitudinal passage, and a sleeve received in said bore, said sleeve having grooves and cross passages adapted to provide fluid communication with said remaining external annular grooves of said spool.

5. A hydraulic anti-lock system according to claim 4, wherein one of said two cross passages which is furthest from said control spring chamber provides fluid communication with an input from a master cylinder and a second of said two cross passages provides fluid communication with an expander chamber, and a pump which is coupled to withdraw fluid from said expander chamber and return it to said longitudinal passage via said second cross passage.

6. A hydraulic anti-lock system according to claim 5, wherein said fixed orifice is located between a master cylinder and said pump, said spool and sleeve in their rest positions isolating said pump output from a master cylinder and restricting fluid flow to a path through said fixed orifice.

7. A hydraulic anti-lock system according to claim 4, wherein said first cross passage is axially displaced away from said control spring chamber with respect to said second cross passage.

8. A hydraulic anti-lock system according to claim 1, wherein said flow valve has an attenuation chamber and a fixed orifice to reduce hydraulic fluid effects produced by a driver's pedal reaction.

9. A hydraulic anti-lock system according to claim 1, wherein said solenoid-operated valve incorporates a valve member, and a seating surrounding an opening of reduced diameter at said end of said spool adjacent said control spring chamber, said valve member being adapted to co-operate with said opening of reduced diameter, and said fixed orifice being defined by an annular passage between said valve member and said opening of reduced diameter at said end of said spool adjacent said control spring chamber.

10. A hydraulic anti-lock system according to claim 9, wherein said valve member of said solenoid-operated valve projects through said passage into said spool.

11. A hydraulic anti-lock system according to claim 10, and guide means located to maintain concentricity between said valve member and said passage.

* * * * *